Jan. 14, 1964    W. KRÖNIG ETAL    3,118,007
DEHYDROGENATION OF HYDROCARBONS
Filed Sept. 23, 1957
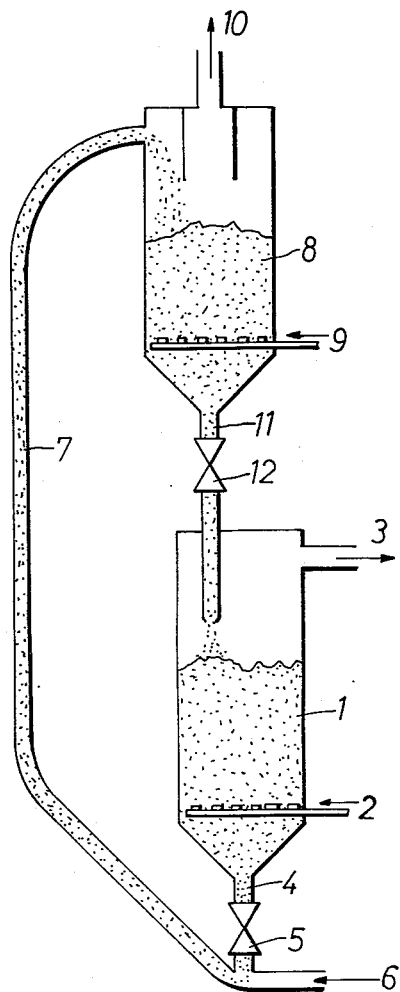
INVENTORS:
WALTER KRÖNIG, OTTO TEGTMEYER, WALTER SCHMIDT, United States Patent Office 3,118,007
Patented Jan. 14, 1964

3,118,007
DEHYDROGENATION OF HYDROCARBONS
Walter Krönig and Otto Tegtmeyer, Leverkusen-Bayerwerk, and Walter Schmidt, Cologne, Germany, assignors to Farbenfabriken Bayer Aktiengesellschaft, Leverkusen, Germany, a corporation of Germany
Filed Sept. 23, 1957, Ser. No. 685,373
Claims priority, application Germany Sept. 24, 1956
10 Claims. (Cl. 260—680)

This invention relates to the dehydrogenation of hydrocarbons and to a process for carrying dehydrogenation.

It is known that the dehydrogenation of hydrocarbons is preferably carried out in such manner that the hydrocarbons to be treated are exposed to elevated temperatures, usually in the presence of a catalyst having a dehydrogenating action, the operation frequently being carried out in the presence of steam or even under reduced pressure in order to displace the thermo-dynamic equilibrium of the reaction more strongly towards the side of the dehydrogenated products, i.e. the products which are required in this case. However, with numerous reactions, also under favorable dehydrogenation conditions, there is obtained with a single throughput through the reaction chamber only a relatively low conversion in the required direction and it is necessary to isolate the unmodified initial material from the reaction products so that it can be returned again to the dehydrogenation process. This is in many cases a complicated and costly process. With rising temperature, the equilibrium is displaced more strongly to the side of the dehydrogenated products. However, well-defined limits are set as regards the use of higher temperatures, since the undesired secondary reactions and more especially cracking of the initial material increase considerably with the rise in temperature.

In order to obviate these difficulties, it has been proposed to supply free oxygen at one or more places in the reaction chamber when carrying out dehydrogenation processes in order that the hydrogen split off in the dehydrogenation reaction is oxidized to water and thus removed from the thermodynamic system. This working method however, involves the disadvantage that with the relatively high dehydrogenation temperatures which are used, the free oxygen, even in the dilution existing in the reaction chamber, is frequently too aggressive in order to produce a defined and selected oxidation effect, and that it is not possible to avoid relatively high concentrations of oxygen occurring locally at the places where the oxygen is introduced into the reaction vessel, which concentrations lead to undesirable secondary oxidizing reactions, while the oxygen is missing at other places in the reaction chamber.

It has now been found that the dehydrogenation of gaseous hydrocarbons is preferably carried out by dehydrogenating continuously the gaseous hydrocarbons in a fluidized bed and in the presence of an iron oxide containing catalyst under formation of water from this hydrogen and from oxygen of the iron oxide whereby said catalyst is continuously removed from the reaction vessel and whereby said catalyst which is diminished in its oxygen content is reoxidized outside the reaction vessel, and then there is added again continuously to the reaction vessel, and whereby on 1 part by weight of the gaseous hydrocarbons 10 to 100 parts by weight of the catalyst are used.

The process of the invention has the advantage that the reaction vessel contains always freshly regenerated catalyst which contains the iron oxide in a higher degree of oxidation. This freshly regenerated catalyst contains the bound oxygen apparently in such manner that part of the oxygen is easily given off under the reaction conditions thus forming water with the hydrogen obtained in the dehydrogenation step.

The course of the process in this case is for example as follows: As catalyst there is used iron oxide which can exist in several degrees of oxidation. This oxide circulates as a fine-grained solid substance between a regenerating vessel in which it is brought to a higher oxidation stage by supply of free oxygen, if necessary in admixture with inert gases or steam, and a reaction vessel in which the oxygen taken up in chemically combined form in the regeneration vessel is transferred to the initial material to be dehydrogenated, so that by direct action of the combined oxygen on the hydrogen to be split off from the hydrocarbon or already split off by catalytic dehydrogenation of the hydrocarbon, the hydrogen is oxidized to water and is thus removed from the thermodynamic system. If necessary, small quantities of free oxygen can also be employed concurrently when using this process.

As compared with the processes which supply free oxygen to the reaction chamber for effecting or promoting the dehydrogenation, the present process in which combined oxygen is supplied has the great advantage that the oxidising action of the oxygen can be carried out substantially more gently and in controlled manner; for example, determining the nature of additions to the iron oxide containing catalyst as well as by regulating the degree of oxidation of the metal oxide at the entrance to the reaction chamber and by adjusting the proportions between iron oxide and the hydrocarbon to be dehydrogenated, it is readily possible for oxygen in an accurately regulated quantity and with an accurately adjustable oxidation potential to be made available for the dehydrogenation process and thus for undesirable secondary oxidizing reactions (for example a too extensive oxidation of the hydrocarbons) to be restricted to a minimum value. As a result of catalyst containing the iron oxide being supplied in fine-grained form to the reaction vessel and being kept in a whirling motion in the said vessel, there is produced an extraordinarily uniform distribution of the combined oxygen throughout the entire reaction chamber and such a degree of uniformity can never be achieved by supplying free oxygen to the reaction chamber.

The following represents one preferred form of the process:

The dehydrogenation reaction can be carried out e.g. in fluidised beds of dense phase in such manner that the substances used as the solid material of the fluidised bed is an iron oxide containing catalyst which is brought preferably on a carrier substance and which can contain further additives which are mentioned below, and the solid substances are allowed to circulate between the reaction chamber and a regeneration chamber in which they are exposed to the action of free oxygen. In the regeneration chamber, the iron oxide is brought to the higher stage of oxidation and the oxygen taken up in the regeneration chamber is transferred by the iron oxide in the reaction chamber to some of the hydrogen from the hydrocarbon, this hydrogen thus being converted into water and therefore separating out from the system. Using this mode of operation, it is possible to advance the course of the dehydrogenation reaction further in the direction of the dehydrogenated products, this substantially simplifying the working up of the reaction product and also resulting in a decisive reduction of the unreacted initial material to be returned into the reaction chamber and thus also in a decrease in the reaction volume which is required. The solid substance circulating between reaction chamber and regeneration chamber does not however serve only as an oxygen carrier, but also as a heat carrier, in order with the aid of the heat taken up in the regeneration chamber to provide the heat required by the dehydrogenation reaction. A further purpose of the circulating solid substance is to accelerate catalytically the splitting off of hydrogen from the initial material employed. The process can consequently perhaps be characterised by the expression "oxidocatalysis."

Suitable as reaction chamber for carrying out the process set forth is for example a vertically disposed vessel into which the initial material to be dehydrogenated, if necessary together with steam, is introduced at the bottom end and maintains the fine-grained solid substance in the reaction chamber in a whirling motion. In those cases in which it is advisable to work with short residence time and high flow velocities in the reaction chamber it is expedient for baffles of suitable form to be arranged rigidly in the reaction chamber, the purpose of such elements being to prevent an undesirably vigorous entrainment of solid substances by the gases and vapors ascending in the reaction chamber. Suitable short durations or lengths of stay for the gases and vapors in the reaction chamber are 0.1 to 3 seconds, preferably 0.2 to 1 second. It is advisable that the temperature immediately above the fluidised bed should be lowered by about 50 to 150° C., for example by injection of heated water. The solid substance arriving from the regeneration chamber or an interposed storage vessel is advantageously introduced into the reaction chamber near the upper limit of the fluidised bed and leaves this chamber at the bottom and below the supply point for the initial material or the steam. There is thus provided a "moving fluidised bed." By the process of our invention about 10 to 100 parts by weight and advantageously 20 to 60 parts by weight of solid substances (catalyst) are conducted through the reaction chamber per part by weight of hydrocarbon to be dehydrogenated. This relatively high circulation of solid substances is also recommended in order to prevent the metal oxide contained in the solid substance being reduced by the hydrogen from the initial substance to the metal form, since the metal, in contrast to the oxide, would catalyze the opposite reaction, namely the hydrogenation of the initial material of the dehydrogenation product which is formed. The solid substance leaving the reaction chamber at the bottom end falls freely into a lifting means, preferably a pneumatic conveying means, by which the solid substance is supplied to a container arranged above the reaction chamber. The regeneration of the catalyst is effected by treatment at an elevated temperature with gases containing oxygen in the pneumatic conveyor pipe (rising pipe) in which the solid substance is raised in dilute phase, or in the dense fluidised bed, into the associated container. If this regeneration is effected in the rising pipe, it can be sufficient to use the aforementioned high-level container as a storage hopper with a dense charge. It is preferred to combine the regeneration of the solid substance with the reheating thereof by the conveying gas, or the gas introduced into the regeneration container may be so heated by combustion of a fuel that the solid substance is given the required temperature. The air supply to the regeneration chamber is advantageously regulated in such manner that 0.1 to 1.0, and preferably 0.3 to 0.7 part by weight of oxygen are introduced for every part by weight of initial material. In the regeneration, not only is the iron oxide in the solid substance brought to a higher stage of oxidation, but in addition any carbon which has been deposited on the solid substance in the reaction chamber owing to secondary reactions is burnt. The regenerated solid substance returns into the reaction chamber by falling freely, thus completing the cycle of circulation of the solid substance.

The solid substance, which must not melt at the temperatures to be used, is preferably employed in granulated form, grain sizes of 0.3 to 3 mm., and preferably 0.5 to 1.5 mm., having proved satisfactory. The iron oxide used as metal oxide of differing degrees of oxidation fluctuates between the regeneration vessel and reaction chamber, substantially between ferric oxide ($Fe_2O_3$) and ferrous oxide (FeO), with ferriferrous oxide ($Fe_3O_4$) as the centre of the fluctuation. It is advisable to supply additives to the iron oxide, these additives being suitable for the formation of spinel with the iron oxide. Aluminum oxide, chromium oxide and copper oxide can inter alia be used for this purpose. These compounds can be added in amounts of up to about 15% related to the entire solid mass. As promoter there can be added for example chromium oxide, copper oxide or silver oxide, e.g. in amounts of about 3–10%. Aluminum oxide, aluminum silicate, magnesium silicate, clay, bleaching earth and the like have proved satisfactory as carrier masses for these active substances. The final catalyst can contain these carrier masses in amounts up to 70%, preferably 30–60%. The finally used iron oxide containing catalyst can be obtained in a simple manner, by mixing the iron oxide, the additives, promoters and carrier masses and forming then the catalyst to the desired shape. The catalyst formed is then heated for some time to obtain a sufficient mechanical strength.

The process of the invention is particularly suitable for the following dehydrogenation reactions: conversion of hydrocarbons into olefines or diolefines, for example n-butene→butadiene; iso-pentene→isoprene; ethyl benzene→styrene, isopropyl benzene→methyl styrene etc. It is advisable to carry out the process of the invention in the presence of water. The water can be added as steam to the hydrocarbons, e.g. before the hydrocarbons are introduced into the reaction vessel. The addition of 1 to 5 and preferably 2.5 to 4 parts by weight of steam to 1 part by weight of the hydrocarbons has proved to be suitable.

The operation is advantageously carried out at ordinary or reduced pressure. Temperatures between 500 and 700° C., preferably 550 and 650° C., are suitable as reaction temperatures. The regeneration temperature is generally 25–150° C. above the reaction temperature.

The hydrocarbon dehydrogenation may be better appreciated by reference to the drawing.

The reaction is carried out in reaction vessel 1 containing the solid iron oxide containing catalyst in a fluidized condition. The gaseous hydrocarbons to be dehydrogenated are introduced through pipe 2 and the dehydrogenated reaction products leave the reaction vessel via pipe 3. The solid substances leave the reaction vessel at 4, pass a regulating device 5 and are transported by means of a pneumatic conveyor pipe 6, 7 into the regeneration vessel 8. In to this regeneration vessel there are introduced through pipe 9 oxidizing gases. The excess gases leave this regeneration vessel at 10. The regenerated solid substances are reintroduced into the reaction vessel 1 through the pipe 11, and pass the regulating device 12 to reach the reaction vessel.

The following examples further illustrate the invention without in any way limiting it thereto.

*Example 1*

A mixture of:

| Constituent— | Percent by weight |
|---|---|
| Ferric oxide | 52.0 |
| Chromium oxide | 7.8 |
| Silver oxide | 5.2 |
| Steatite | 35.0 |
| Total | 100.0 | is used as catalyst. After being moistened with water, this mixture is converted in a suitable mixing device into granules with a diameter of 0.5 to 1.5 mm., which are heat-treated for 4 hours at 1000° C. after drying, whereby they are given good mechanical strength. This solid substance is caused to circulate between a reaction vessel, a rising pipe, a regeneration container and back to the reaction vessel. The heating of the contents of the regeneration vessel to 650° C. is effected by smoke gas from the combustion of fuel gas with excess air; thereby there are used 0.37 part by weight of oxygen per 1 part by weight of butene. The quantity of solid substance circulating is 70 parts by weight to 1 part by weight of n-butene introduced into the reaction vessel. A mixture of 1 part by weight of n-butene and 3.2 parts by weight of steam is introduced at the bottom into the reaction vessel, the contents of which are adjusted to 600° C. The solid substance (catalyst) in the regeneration container and in the reaction vessel is in a fluidised condition, the baffle plates arranged in the container ensuring that the fluidised bed exists in the dense phase. The length of stay of n-butene and steam in the fluidised bed of the reaction vessel is about 0.4 sec. The temperature immediately above the upper limit of the dense fluidised bed is lowered to 500° C. by injection of heated water. The following results were produced: 69% of the carbon introduced (in the form of n-butene) is converted in a single passage through the reaction chamber. The following quantities of products were obtained:

81% butadiene
14% in the form of $CO_2+CO+C$
0.6% n-butane
3.5% as cleavage products ($C_1$–$C_3$ hydrocarbons).

If the amount of circulating catalyst is diminished to 10 parts by weight per 1 part by weight of n-butene there are converted only 57% of butene in a single passage instead of the above-mentioned 69%. The percentage of butadiene obtained as reaction product remains constant.

If instead of butene, isopentene is used, isoprene is obtained as main reaction product.

Example 2

A mixture of 50% by weight of ferric oxide and 50% by weight of aluminum oxide is used as catalyst containing a solid oxygen carrier. After addition of 26 parts by weight of water the mixture is converted into granules with a diameter of 0.3–1.5 mm., which are heat-treated at 1150° C. for 12 hours after drying. Of these granules the particles having a diameter of 0.3–1.2 mm. and a bulk density of 1.16 g./cm.$^3$ are used as catalyst. The initially good mechanical strength of the catalyst is further improved during the process of the invention since the surface of the individual particles is given an increased density of sintered appearance, which is probably due to the alternation of reduction and oxidation. However, despite the outward denser structure, the surface area is then many times that before the catalyst is applied.

This catalyst containing iron oxide as oxygen carrier is used to convert n-butylene to 1.3-butadiene as described in Example 1. The re-heating and re-oxidation of the catalyst is carried out in the rising pipe with town gas and surplus air. The air surplus contains thereby 0.9 part by weight of oxygen per 1 part by weight of n-butene. The temperature during this re-oxidation is about 740° C. The regeneration container described in Example 1 is used by this procedure as a storage hopper for the catalyst. The amount of solid substance (catalyst) circulating is about 80 parts by weight per 1 part by weight of n-butylene. The following results are obtained: 80% by weight of the carbon introduced (in the form of n-butene) is converted in a single passage through a reaction chamber, the following products being obtained:

| | Percent by weight |
|---|---|
| Butadiene | 79.8 |
| $CO_2+CO+C$ (the carbon is precipitated on the solid substances) | 16.7 |
| n-Butane | 0.5 |
| Cleavage products ($C_1$–$C_3$ hydrocarbons) | 2.9 |
| i-Butene | 0.1 |
| Total | 100.0 |

Example 3

Granular solids of the composition:

50% of ferric oxide
25% of clay
25% of silicic acid (kieselguhr)

and a particle size of 0.3–1.2 mm. are used as oxygen containing catalyst. The granules are produced as described in Example 1.

This catalyst passes the reaction and regeneration chamber under the reaction conditions described in Example 1. The amount of solid substance (catalyst) circulating is about 100 parts by weight per 1 part by weight of n-butene. At a reaction temperature of 600° C. and a length of stay in the reactor of 0.5 sec. 73.2% by weight of the carbon, in the form of n-butene, are converted in a single passage through the reaction chamber. Of the reacted carbon, the following quantities of products are obtained:

81.5% $C_4H_6$ (i.e. 59.7 in a single passage)
15.9% $CO_2+CO+C$
0.7% as cleavage products ($C_1$–$C_3$ hydrocarbons)

When the temperature in the reactor is reduced to 540° C. 73.2% of the butene carbon are converted in a single passage under otherwise equal conditions and recirculation of the catalyst. In this case of the reacted carbon, the following quantities of products are obtained:

82.4% in the form of $C_4H_6$ (i.e. 60.3% in a single passage)
14.8% in the form of $CO_2+CO+C$
0.8% as cleavage products ($C_1$–$C_3$ hydrocarbons)

Despite the considerable reduction of the reaction temperature in the second process, the results are substantially the same as those obtained at a reaction temperature of 600° C. The conversion rate at a reaction temperature of 540° C. was expected to be substantially lower, since the thermodynamic equilibrium is reduced from 70% and 50% of the reaction of butene→butadiene when the temperature is lowered from 600–540° C. It is obvious from this deviation of the results of the reactions from the theoretical calculation that the hydrogen set free in the dehydrogenation of butene according to the herein described process is instantaneously oxidised by the oxygen of the oxygen carrier to water and is thus removed from the equilibrium.

Whereas 1 part by weight of free $H_2$ is normally obtained per 1 part by weight of butadiene, the aforesaid reaction produces:

| At | 600° C. | 540° C. |
|---|---|---|
| Volume $H_2$ per 100 parts by volume of butadiene | 20.3 | 10.8 |

Example 4

Granular solids of the composition:

50% by weight of ferric oxide
40% by weight of aluminum silicate (bentonite)
10% by weight of silicic acid (kieselguhr)

having a particle size of 0.3–1.2 mm. are used as oxygen containing catalyst. This oxygen carrier is produced as described in Example 1.

The aforesaid catalyst passes through the reaction and regeneration chamber described in Example 1, the reaction chamber being kept at 625° C. and the regeneration chamber at 740° C. The sensible heat of the regenerated contact material leaving the regeneration chamber is utilized to preheat the water vapor entering the regenerator so that the catalyst enters the reactor at a temperature adjusted to maintain the reaction temperature chosen.

A mixture of 1 mol of ethyl benzene and 10 mols of water vapor are introduced through the bottom of the reactor. The reactants impart a fluidized condition to the catalyst in the reaction chamber. The length of stay of the reactants in the reactor filled with the catalyst is 0.7 sec. 55% by weight of the ethyl benzene introduced are obtained as styrene in a single passage through the reaction chamber. The amount of solid substance (catalyst) circulating is about 50 parts by weight per 1 part by weight of ethyl benzene.

If isopropyl benzene is used instead of ethyl benzene there is obtained about the same amount of methyl styrene.

We claim:

1. Process for the dehydrogenation of gaseous hydrocarbons with iron oxide containing catalysts in a fluidized bed which comprises continuously contacting the gaseous hydrocarbons at an elevated temperature with the iron oxide containing catalyst which is being maintained in a fluidized condition with the formation of water from the hydrogen split off from the hydrocarbons with the oxygen derived from the iron oxide containing catalyst, said iron oxide being introduced into the reaction vessel in a high state of oxidation and being removed from the fluidized bed in a lower state of oxidation, substantially no free iron being formed in the dehydrogenation reaction, substantially continuously withdrawing the iron oxide catalyst from the reaction vessel, reoxidizing and reheating the same and thereafter substantially continuously returning the reoxidized iron oxide containing catalyst to the reaction vessel, the catalyst being supplied in an amount of 10–100 parts per weight per 1 part by weight of the gaseous hydrocarbons and recovering the dehydrogenated gaseous hydrocarbons.

2. Process as claimed in claim 1 which comprises carrying out the process in the presence of steam.

3. Process as claimed in claim 1 which comprises moving the iron oxide containing catalyst in counter current to the gaseous hydrocarbons to be dehydrogenated.

4. Process as claimed in claim 1 which comprises using a catalyst having a grain size of 0.3 to 3 mm.

5. Process as claimed in claim 1 which comprises using an iron oxide containing catalyst which additionally contains metal oxides which are able to form spinels with the iron oxide.

6. Process as claimed in claim 5 wherein as metal oxide there is used a member selected from the group consisting of aluminum oxide, chromium oxide and copper oxide.

7. Process as claimed in claim 1 which comprises carrying out the dehydrogenation at a temperature range of between 500 to 700° C.

8. Process as claimed in claim 1 which comprises reoxidizing the catalyst outside of the reaction vessel at a temperature which is 25 to 150° C. above the temperature of the reaction vessel.

9. Process as claimed in claim 1 which comprises using for the re-oxidation of the catalyst 0.1 to 1.0 part by weight of oxygen per 1 part by weight of hydrocarbon to be dehydrogenated.

10. Process for the dehydrogenation of a monoolefin hydrocarbon to the corresponding diolefin which comprises contacting said monoolefin at a temperature in the range from about 500° C. to 540° C. with a solid oxidant consisting essentially of ferric oxide in a fluidized bed, the weight ratio of hydrocarbon being from about one to two parts of hydrocarbon per 100 parts of solid, the contact time between the monoolefin and the solid being from 0.3 to 3 seconds, whereby a substantial proportion of monoolefin is converted to diolefin and at least a substantial portion of said ferric oxide is reduced to a lower oxidation state, then separately oxidizing the resulting reduced ferric oxide back to ferric oxide and recovering said diolefin as the major reaction product.

References Cited in the file of this patent

UNITED STATES PATENTS

| | | |
|---|---|---|
| 2,616,898 | Keith | Nov. 4, 1952 |
| 2,671,719 | Lewis et al. | Mar. 9, 1954 |
| 2,848,521 | Polk | Aug. 19, 1958 |
| 2,866,790 | Pitzer | Dec. 30, 1958 |
| 2,866,791 | Pitzer | Dec. 30, 1958 |
| 2,870,228 | Armstrong et al. | Jan. 20, 1959 |